United States Patent
Kraiczek et al.

(10) Patent No.: US 6,525,884 B2
(45) Date of Patent: Feb. 25, 2003

(54) OPTICAL BEAM SPLITTER THAT CAN BE MANUFACTURED BY MICROMECHANICAL MEANS

(75) Inventors: Karsten Kraiczek, Landau (DE); Beno Mueller, Ettlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/809,382

(22) Filed: Mar. 15, 2001

(65) Prior Publication Data

US 2002/0075567 A1 Jun. 20, 2002

(30) Foreign Application Priority Data

Mar. 17, 2000 (DE) .......................... 100 13 261

(51) Int. Cl.⁷ .................. G02B 27/14; G02B 27/10; G02B 5/04
(52) U.S. Cl. .................. 359/629; 359/619; 359/636; 359/638; 359/833
(58) Field of Search ................. 359/613, 619, 359/629, 636, 638, 637, 831, 833, 834, 627; 396/447, 548; 40/615

(56) References Cited

U.S. PATENT DOCUMENTS

| | | | | |
|---|---|---|---|---|
| 2,043,292 A | * | 6/1936 | Hillman | 359/636 |
| 3,694,945 A | * | 10/1972 | Detiker | 40/615 |
| 4,302,089 A | * | 11/1981 | Fukuhara | 396/447 |
| 4,586,786 A | * | 5/1986 | Suzuki et al. | 359/636 |
| 4,797,696 A | * | 1/1989 | Allen et al. | 396/548 |
| 5,243,465 A | * | 9/1993 | Fein | 359/636 |
| 5,450,240 A | * | 9/1995 | Hall II et al. | 359/613 |

* cited by examiner

*Primary Examiner*—Georgia Epps
*Assistant Examiner*—Gary O'Neill

(57) ABSTRACT

A beam splitter has a support frame made of silicon that has a membrane inside made of silicon. The membrane has in particular openings with bridges formed between them. On the side of membrane facing the incident beam is an aluminum coating to increase the reflectability or degree of reflection of the membrane. An incident beam bundle contacts the beam splitter at angle of incidence φ. A portion of the incident beam is reflected off the bridges, and the remaining portion of the beam freely passes through the openings. The beam is correspondingly divided into a reflective portion and transmitted portion.

44 Claims, 3 Drawing Sheets

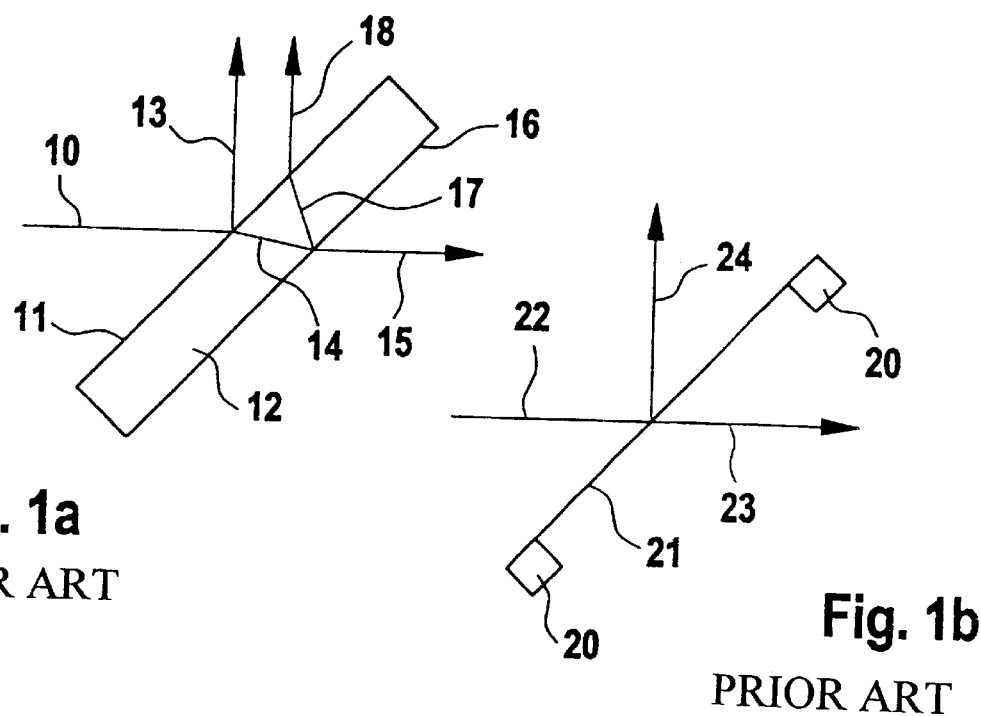
Fig. 1a PRIOR ART
Fig. 1b PRIOR ART
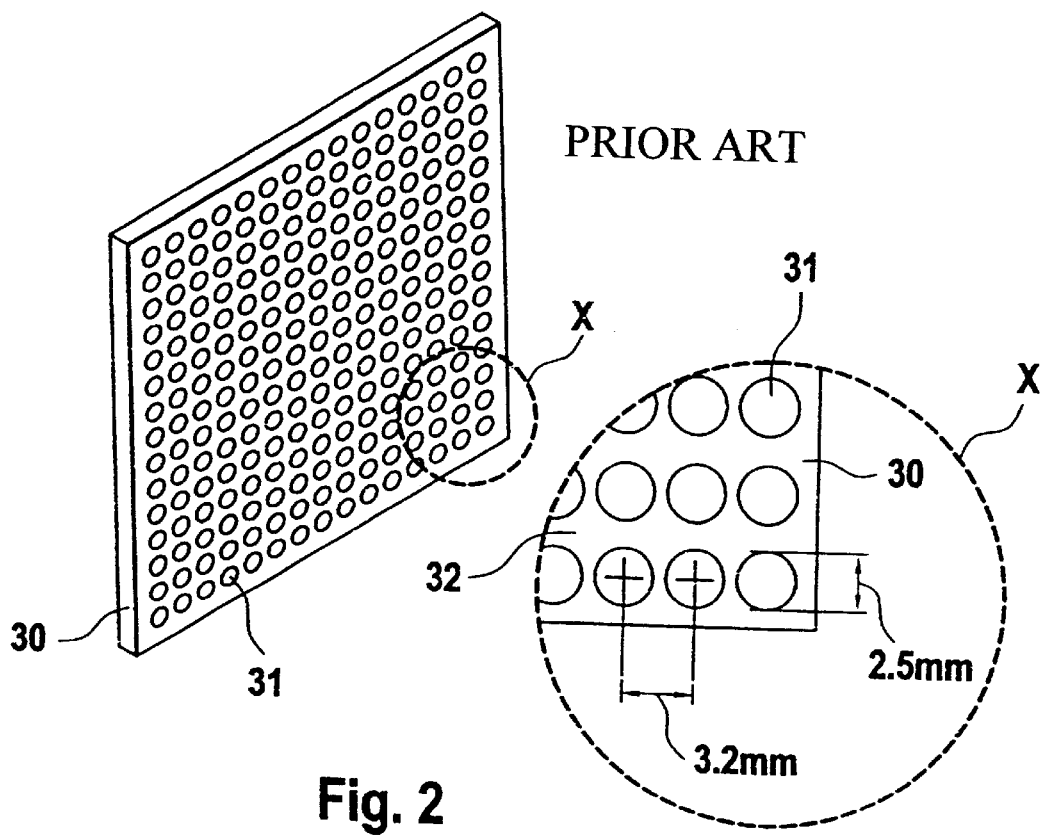
PRIOR ART
Fig. 2

OPTICAL BEAM SPLITTER THAT CAN BE MANUFACTURED BY MICROMECHANICAL MEANS

FIELD OF THE INVENTION

The invention concerns a beam splitter to divide an electromagnetic beam into at least two partial beams. In particular, the invention refers to such a beam splitter with essentially flat functional elements that divide the beam.

BACKGROUND OF THE INVENTION

There already exist a series of various technologies for the above-cited beam splitter to cause the cited division of the beam. There operation is based on optical properties of a basic dielectric, and especially reflection of the incident beam from optical boundary surfaces is used. Such a beam splitter is shown in FIG. 1a. An incident beam 10 falls on the front outer surface 11 of a dielectric 12 and is partially reflected there 13. The transmitted beam part 14 then penetrates 15 a rear outer surface 16 of the dielectric 12 and is also partially reflected there 17. Some of the partially reflected beam 17 then leaves 18 the front outer surface 11 of the dielectric 12 and forms a partial beam bundle 13, 18 together with partial beam 13. Note that FIG. 1a is greatly simplified; when partial beam 17 contacts the front outer surface 11, additional reflection arises what is not represented here.

In these simplified representations, we can see two basic problems with the cited beam splitter. On one hand, so-called ghost images arise due to the displayed double reflection which substantially impair the beam properties of the reflected beam and, in particular, cause beam expansion. In addition, the arising parallel displacement of the penetrating (transmitted) beam produces axial image displacement, which is also frequently undesirable or even unacceptable.

The cited problems have already led to the development of beam splitters in which the thickness of the dielectric (viewed in the direction of the transmitted beam) is extremely thin to minimize the cited effects arising from multiple reflections and parallel displacement of the penetrating beam. Such a membrane beam splitter is schematically illustrated in FIG. 1b. This beam splitter has a membrane 21 in a frame 20. An incident beam is partially transmitted 23 through the membrane as well as partially reflected 24. These membrane beam splitters 20,21 are designed to be thin enough (approximately two pm nitrocellulose film) so that both reflected beam bundles 24 are practically completely superposed, i.e., there is no beam displacement or beam expansion (as described above). This beam splitter has the disadvantage, however, that is not suitable for the outside UV range; in addition, the interference that usually arises with thin membranes is greatly disturbing when such beam splitters are used.

Furthermore, other beam splitters have been suggested in which the outer surfaces are wedge-shaped to block the reflected partial beams; however, the bend in the optical axis is disadvantageous.

The above-described relevant state-of-the-art is also published in a catalog by Oriel Instruments under the title of *The Book of Photon Tools* in the section "Prism and Beam Splitters, Beam Splitters Technical Discussion". FIGS. 1 and 2 are taken from this catalog. The cited disadvantages have also produced a completely different approach which is also described in the catalog. The basic beam splitter principle will now be briefly discussed with reference to the perspective view in FIG. 2 (with an enlarged section shown in the right half of the figure) of such a beam splitter. With this beam splitter, the beam is divided by means of a point pattern 31 on a highly-reflective material on a dielectric 30; an aluminum layer in this case. With this beam splitter, part of an incident beam is reflected off the point pattern 31, and the other part is transmitted through the uncoated areas 32 of the dielectric 30. By tilting the beam splitter in reference to the optical axis of the incident beam, the incident beam can be divided into partial beams similar to the method shown in FIG. 1.

All of the above described beam splitter technologies still have substantial disadvantages. On one hand, chromatic, spherical and astigmatic image errors arise, and there is also a relatively large reflection loss and intensity loss as the beam passes through the dielectric. As the beam passes through the dielectric, and initially unpolarized beam becomes partially polarized due to the angle of installation required to divide the beam. The cited disadvantages can at least be reduced by additional measures, however. For example, the intensity of the cited ghost images can be reduced e.g. by using reflection-reducing coatings and/or even sup pressed by blocking out disturbing reflections.

OBJECTS AND ADVANTAGES OF THE INVENTION

It is therefore the problem of the present invention to describe and present a beam splitter of the above-described kind that avoids the cited disadvantages of state-of-the-art beam splitters.

In particular, optical image errors such as the generation of ghost images, parallel displacement between incident and exiting beams as well as axial beam displacement or image haziness are effectively avoided as much as possible.

In addition, the reflection and transmission loss in the cited dielectrics is avoided as much as possible.

Furthermore, the invention prevents in particular the reflected beams from becoming polarized at certain angles of incidence due to reflection, and therefore prevents the exiting partial beams from being polarized in contrast to the incident beam.

In addition, the beam splitter is useful over the entire optical wavelength range and is highly suitable for the ultraviolet range of the spectrum.

Finally, the beam splitter is easier and hence more economical to manufacture than prior-art beam splitters.

SUMMARY OF THE INVENTION

The cited problems are solved with a beam splitter of the initially-cited type in that the functional element has openings or perforations corresponding to a point pattern. The areas of the functional element between the openings are essentially reflective, at least on the side the incident beam, and are essentially designed to form parallel exiting partial beams.

The incident beam is divided by the beam splitter according to the invention as follows: a portion of the incident beam (the portion contacting the membrane at the height of the openings) can freely pass through the beam splitter, and the remaining portion of the incident beam is reflected off the areas of the functional element between the openings. Since the transmitted beam portion is transmitted exclusively in air, an optical active medium such as a dielectric can accordingly be dispensed with; there is therefore no intensity loss, polarization, or imaging errors of the transmitted beam as is the case with state-of-the-art beam splitters as described in the introduction. By suitably selecting a reflective coating on the side of the functional element facing the incident beam, the reflected beam portion can also exit the beam splitter almost without any loss in intensity and without any polarization.

The functional element is preferably designed as a membrane that can be manufactured from a material that is essentially non-transparent to the respective electromagnetic beam or a material that is impermeable to the beam, in particular from a semiconductor material, metal, etc. The membrane with the corresponding openings can be manufactured by micromechanical means in particular, which allows the openings and especially their opening cross-sections to be microscopic so that the beam splitter can be used for a wide range of beam diameters. This advantageously allows the beam splitter to be used in the field of laser optics. For the cross-section of the incident beam to cover a sufficient number of openings to ensure a fixed and predetermined divider ratio, the average distance between two openings can be smaller by at least a factor of 2 to 5 than the diameter of the incident beam.

The functional element is preferably approximately 1–100 μm thick at the openings. The respective micromechanical manufacturing procedure depends upon the respective starting material, i.e., photolithographic etching techniques or laser-support etching of semiconductor materials, or mechanical or chemical thinning of a metal sheet or film followed by drilling (especially micro-drilling) the metal sheet or film created in this manner to form the openings.

For the functional element to be reflective at least on the side of the incident beam, a reflective layer can be applied to this side of the element, or this side of the element can be polished, especially by electrochemical means.

In regard to the arrangement of the openings in the plane of the functional element, the openings can be designed as an evenly distributed point pattern. Any conceivable point distribution can be used such as a rectangular or obliqueangled pattern, or a pattern that optimally exploits the surface of the functional element (e.g. the form of a packed dense sphere). In one embodiment variation, the point pattern can have an uneven distribution in at least one spatial direction so that the beam splitter can be segmented into areas with different divided beam ratios. Alternately, this type of segmentation can also obtained by creating areas with different cross-sections of the openings.

When a beam splitter according to the invention is used in an optical measuring setup, it is preferably rotated or tilted in reference to the optical axis formed by the incident beam so that the reflected beam does not coincide or collide with the incident beam. To effectively prevent a divided beam ratio that depends on the respective angle of rotation, the functional element can also be designed so that its thickness at the openings preferably yields a ratio much smaller than 1 in relation to the cross-section of the opening. The larger the ratio, the lower the yield of the transmitted beam independent of the rotational angle of the beam splitter since the yield can basically only be influenced by additional reflection arising from the edges of the openings.

The openings are preferably square or round. The three-dimensional design of the openings primarily depends on the respective manufacturing procedure, i.e., the design is basically square following the crystal axis when semiconductor material is chemically etched, or round when a metal film is micro-drilled.

Given the relative thinness of the functional element at the openings, the edge of the functional element can be held by a support to increase the overall mechanical stability of the functional element. The support element is preferably designed as a material bead (thickening) of the starting material, i.e., formed by anisotropic etching using a photolithographic mask on a semiconductor material. When a metal film is the starting material, the support element can be created by not thinning the metal film at the edge, i.e., by using a suitable mask when the metal film is chemically thinned.

Finally, when a semiconductor material is used, the functional element can be advantageously manufactured by placing numerous functional elements on a wafer. This allows the beam splitter according to the invention to be mass-produced similar to semiconductor chips in the field of microelectronics.

BRIEF DESCRIPTION OF THE DRAWINGS

The invention will be further explained below with reference to drawings; the same reference numbers refer to functionally equivalent or similar features.

FIGS. 1a,b shows schematic beam paths in two embodiments of a state-of-theart beam splitter;

FIG. 2 shows a correspondingly enlarged section in greater detail of another exemplary embodiment of a state-of-the-art beam splitter;

DETAILED DESCRIPTION OF THE INVENTION

FIGS. 1 and 2 have already been discussed when describing the state-of-the-art in the descriptive introduction.

Figure 3A:
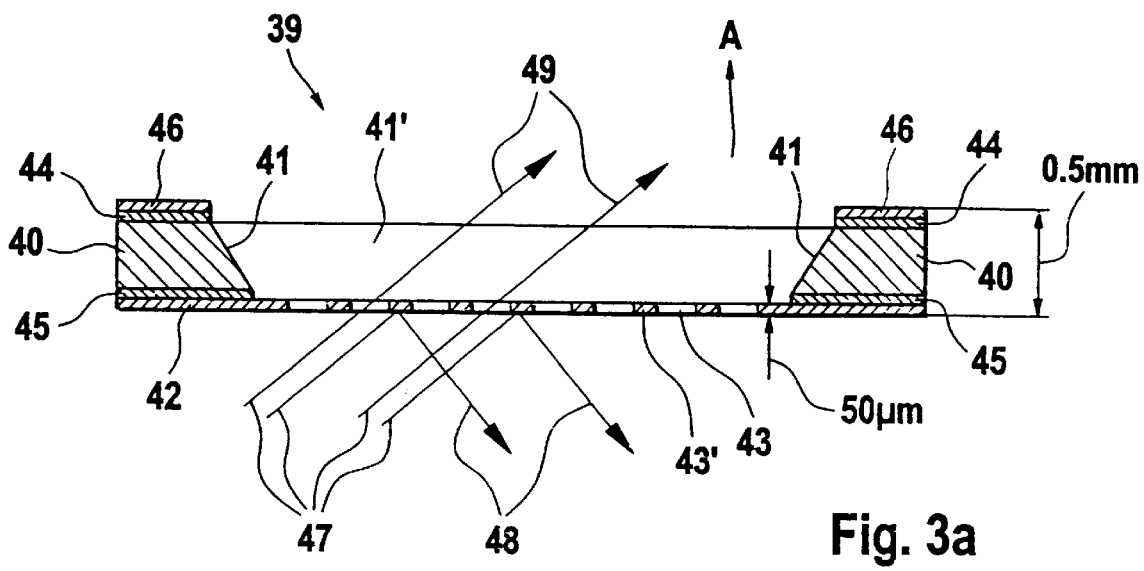
FIGS. 3a,b shows two orthogonal views of a preferred embodiment of a beam splitter according to the invention.

FIG. 3a is a side view of a preferred embodiment of a beam splitter 39 according to the invention. The beam splitter 39 has a support frame 40 made of silicon with a bevel 41 at the opposing side of an incident beam (beam direction following arrow "A"). The support frame is square, and the length of the edges is approximately 10–20 mm. The support frame 40 is approximately 0.5 mm thick. A recess 41' formed by the bevel 41 ends in a membrane 42 made of silicon nitride at the side of the beam splitter facing the incident beam A. The silicon nitride, as discussed below, serves as a mask when manufacturing the displayed structures of the beam splitter, especially a beam splitter manufactured purely by micromechanical means. In particular, the membrane 42 has openings 43 between which bridges 43' are formed. A corresponding silicon nitride layer 46 is also on the side A of the beam splitter facing away from the incident beam. There are additional silicon dioxide layers 44,45 between the silicon substrate 40 and the two silicon nitride layers 42, 46. On the silicon dioxide layer 45 facing the incident beam 47, there is also an aluminum coating to increase the reflectability or degree of reflection of the membrane 42 so that the ratio of reflected beam to transmitted beam can be better predicted.

Let us assume that an incident beam bundle 47 (this can be a light beam or an electromagnetic beam of any wavelength) contacts the beam splitter 39 at an angle of incidence φ. A portion 48 of the incident beam 47 is reflected off the bridges 43', and the remaining portion 49 of the beam 47 is freely transmitted through the openings 43. The beam is correspondingly divided into the reflected part 48 and the transmitted part 49.

Figure 3B:
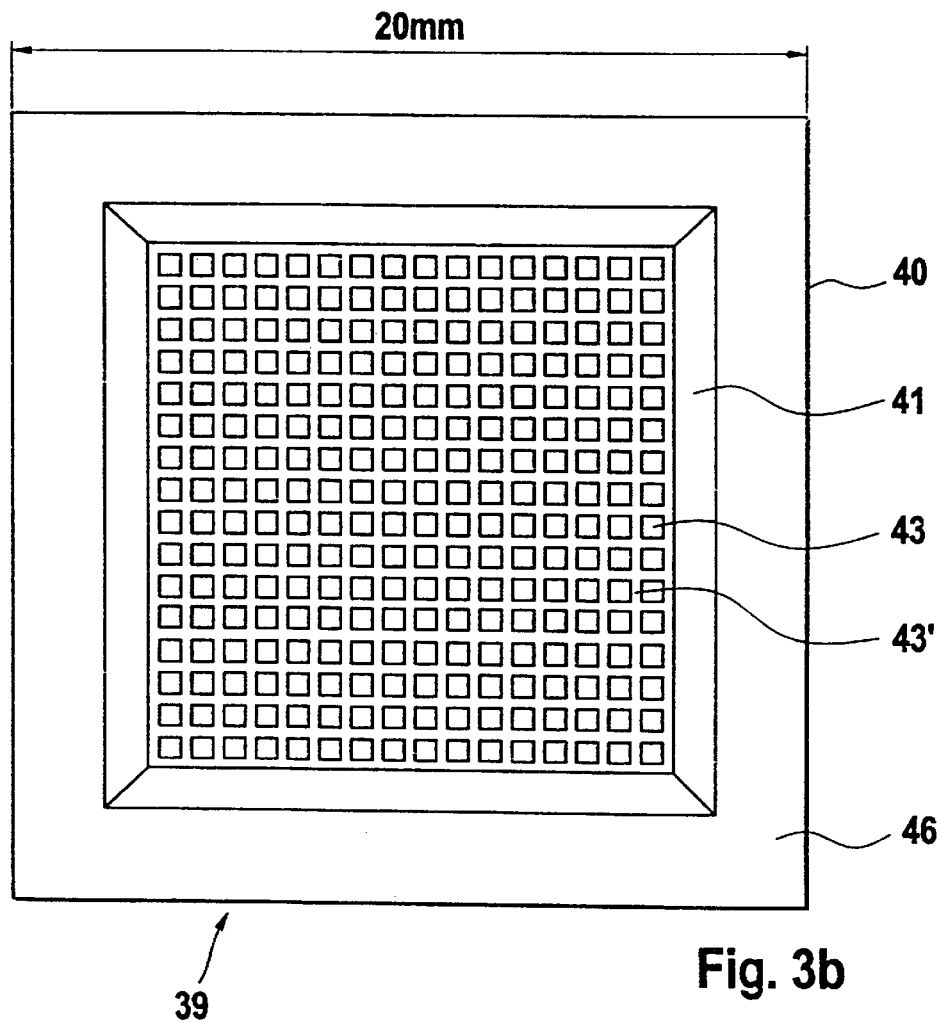

FIG. 3b shows a corresponding top view of the beam splitter 39 displayed in FIG. 3a opposite the visual angle of the incident beam A. On the surface of the support frame 40, one can see the silicon nitride layer 46 and the bevel 41 in the portrayed view. In addition, the openings 43 and corresponding bridges 43' are clearly visible in this drawing. The openings 43 are square due to the manufacturing process (described below) in the present exemplary embodiment. Depending on the manufacturing process, the openings can be in numerous geometric shapes as will be described in greater detail below.

The beam splitter according to invention is manufactured as follows: A membrane is created by anisotropic etching in a wafer made of silicon or another suitable semiconductor material, and the membrane is structured according to the desired partial beam ratio in another step. The silicon forms the mechanical frame of the beam splitter. As needed, the silicon chip can be embedded in another frame, e.g. a metal or plastic frame. Both sides of the silicon wafer are coated with silicon oxide and silicon nitride. The required photolithographic steps to define the frame and openings are also done to both sides of the wafer before major etching of the silicon. The silicon nitride mask on the front and the silicon dioxide and silicon nitride mask on the back are opened or perforated to form openings. Subsequently, the silicon is removed by means of anisotropic etching technique(s) until a thin membrane layer remains. Then the SiO$_2$ part of the membrane is completely etched away. A grid of silicon nitride remains that is then metallized with aluminum from the front. Then the beam splitter chips are separated in a sawing process and clamped as necessary. The membrane either consists of just SiO$_2$ or Si$_3$N$_4$. Alternately, the membrane is made of heavily doped silicon or a combination of the cited layers. The manufacturing process can be varied in any way.

Figure 4A:
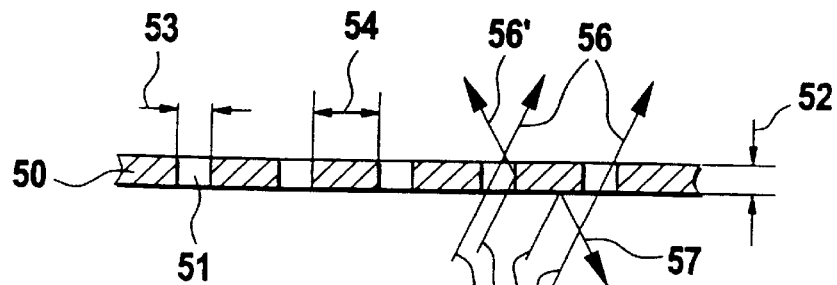
FIGS. 4a,b shows two alternative embodiments with different opening crosssections according to the invention.
Figure 4B:
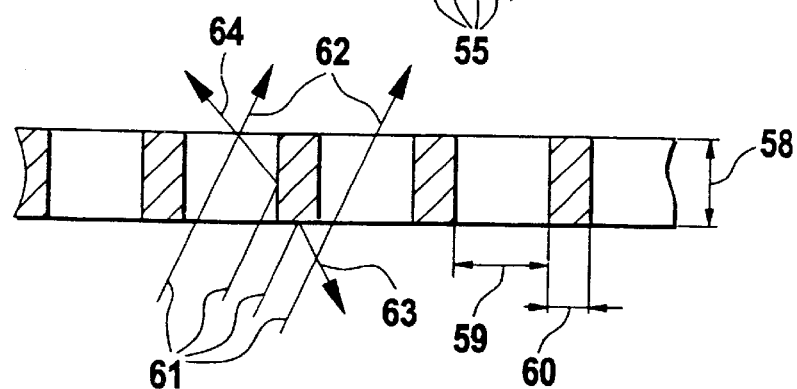

With reference to FIGS. 4a and 4b, let us now discuss how the divided beam ratio between reflected and transmitted beams can be adjusted solely by the dimensions of the beam splitter, and which geometric parameters must be taken into account. The figures show an enlarged side view of the section of a membrane with bridges 50 and openings 51.

The representation of a membrane embodiment with only a very schematic indication of the actual dimensions in FIG. 4a is distinguished from the membrane shown in FIG. 4b in that the membrane thickness 52 is smaller. Ideally, the membrane thickness 52 is substantially less than the lateral dimensions of the openings 53 and the bridges 54. The advantage of the thinness is that an incident beam bundle 55 that passes through the openings 51 is only reflected relatively slightly off of the inside of the respective openings, and hence the intensity of the transmitted partial beam 56 is substantially greater than the intensity of the reflected transmitted partial beam 56'. The divided beam ratio between the transmitted partial beam 56 and reflected partial beam 57, i.e. the respective ratio of intensities between these partial beams is substantially less than 1 in the example since the opening cross-section 53 is correspondingly less than the width 54 or the area of the bridges 50.

In the embodiment of the membrane in FIG. 4b (also only schematically portrayed), the membrane thickness 58 is substantially greater than the bridge width 60 which, for example, can be due to the method of manufacture or the used membrane material. The membrane thickness can be substantially greater than the opening cross-section 59 in contrast to the portrayed example. An incident beam bundle 61 is divided into a transmitted beam portion 62 and a reflected beam portion 63. Due to the greater membrane thickness 58, there is more reflection 64 in this instance in contrast to the embodiment in FIG. 4a; however, this reflection generally guides the corresponding partial beams 64 out of the optical axis and therefore usually does not have a negative effect. In contrast, these reflected transmitted partial beams 64 can be specifically used to divide beam into three parts.

Figures 5A, 5B:
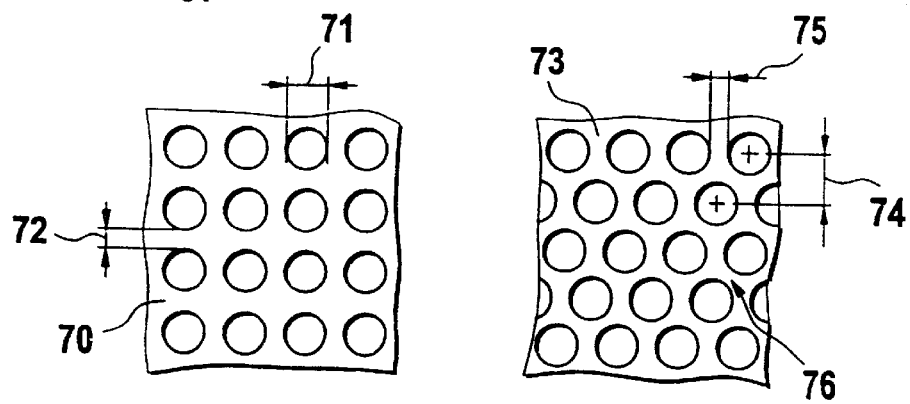
FIGS. 5a,b shows two alternative embodiments with different point patterns and circular openings according to invention.

FIGS. 5a, b schematically illustrate membrane sections in a top view of two alternate embodiments with different point patterns and circular openings. FIG. 5a shows a membrane section 70 with a cubical grid arrangement with opening cross-section 71s and spaces 72 between the openings. The membrane section 73 in FIG. 5b contrastingly has a hexagonal opening arrangement with their respective spacing 75 and section widths 75. The advantage of densely-packed openings as in FIG. 5b in contrast to the cube arrangement in FIG. 5a is that the transmitted portion can be substantially improved in contrast to the reflected portion despite the stable layout of the intermediate sections 76.

Figure 6:
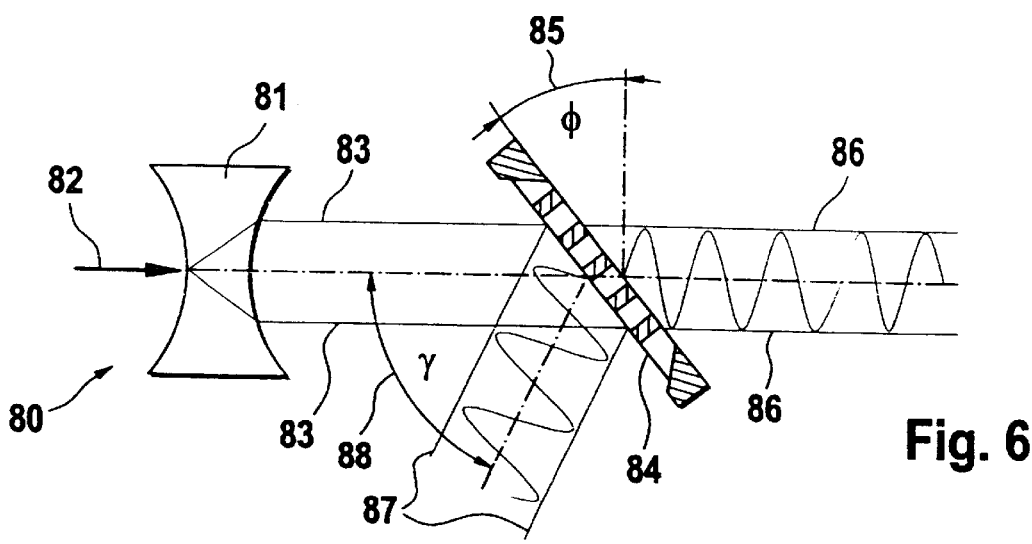
FIG. 6 shows a typical optical measuring setup with a beam splitter according to invention.

In conclusion, FIG. 6 is a schematic representation of an optical measuring arrangement 80 containing a beam splitter according to the invention. The measuring arrangement 80 has a diffusing lens 81 by means of which an incident beam 82, e.g. a laser beam, can be widened 83 enough to basically cover the entire surface of a beam splitter according to the invention or its membrane 84. The beam splitter 84 is at an angle φ 85 in relationship to the orthogonals to the optical axis. The incident beam bundle 83 is divided into a transmitted beam portion 86 and a reflected beam portion 87. The angle of reflection γ 88 is essentially determined by the tilt angle φ 85.

What is claimed is:

1. A beam splitter to split an incident electromagnetic beam into a plurality of partial beams, said beam splitter comprising:

a beam splitting, flat functional element, wherein said functional element has openings corresponding to a point pattern, and areas between said openings that are reflective on a side of said functional element on which said incident beam impinges, wherein said openings provide for exiting partial beams, and wherein said functional element has a thickness such that a ratio of said thickness to a cross-section of said openings is less than 1.

2. A beam splitter according to claim 1, wherein said functional element is designed as a membrane.

3. A beam splitter according to claim 1, wherein said functional element is manufactured from an essentially non-transparent material.

4. A beam splitter according to claim 1, wherein said functional element is made of metal foil.

5. A beam splitter according to claim 1, wherein said point pattern is an essentially uniform point grid.

6. A beam splitter according to claim 1, wherein said cross-section has a different design, at least in one spatial direction.

7. A beam splitter according to claim 1, wherein said thickness is in a range of about 1 to 100 μm at said openings.

8. A beam splitter according to claim 1, wherein an average distance between two of said openings is less than a diameter of said incident beam by at least a factor having a range of about 2 to 5.

9. A beam splitter according to claim 1, wherein said openings are essentially square.

10. A beam splitter according to claim 1, wherein said functional element comprises a material layer at least on a side of the functional element on which said incident beam impinges that is reflective.

11. A beam splitter according to claim 1, wherein said functional element comprises a support element.

12. A beam splitter according to claim 1, wherein said functional element has at least two areas with at least one of different point patterns and different distributions of cross-section of said openings.

13. A beam splitter according to claim 1, wherein a divided beam ratio can be set by changing an angle of a surface plane of said functional element in relation to an angle of incidence of said incident beam.

14. A method to manufacture a beam splitter to split an incident electromagnetic beam into a plurality of partial beams by use of a beam splitting, flat functional element, said method comprising:
providing a flat substrate that is at least one of non-transparent to said beam or reflective of said beam, and
structuring said substrate with openings corresponding to a point pattern,
wherein said substrate has a thickness such that a ratio of said thickness to a crosssection of said openings is less than 1.

15. A method according to claim 14, wherein said functional element is manufactured by micro-mechanical means.

16. A method according to claim 14, wherein said functional element is manufactured by means of photolithographic chemical etching.

17. A method according to claim 14, wherein a ceramic material is used as the substrate material.

18. A method according to claim 14, wherein said openings of said substrate are created by drilling.

19. A method according to claim 14, wherein an essentially reflective layer is applied to said substrate at least on a side on which said incident beam impinges.

20. A method according to claim 14, wherein said substrate is polished at least on a side on which said incident beam impinges.

21. A method according to claim 14, further comprising setting a divided beam ratio between transmitted and reflected beams by adjusting said thickness and by at least one of arranging or dimensioning said openings.

22. A method according to claim 14, wherein at least two functional elements are manufactured on said substrate.

23. A beam splitter according to claim 2, wherein said membrane is manufactured by micromechanical means.

24. A beam splitter according to claim 1, wherein said functional element is manufactured from a semiconductor material.

25. A beam splitter according to claim 1, wherein said functional element is manufactured from a metal.

26. A beam splitter according to claim 1, wherein said point pattern is a point grid with a point distribution that changes in steps with at least one step and is uneven in at least one spatial direction.

27. A beam splitter according to claim 1, wherein said openings are essentially round.

28. A beam splitter according to claim 10, wherein material layer comprises a metal film.

29. A beam splitter according to claim 11, wherein said support element is located at a perimeter of said functional element.

30. A beam splitter according to claim 11, wherein said support element comprises a support frame formed out of the material of the functional element.

31. A method according to claim 16, wherein said means of photolithographic chemical etching comprises anisotropic etching.

32. A method according to claim 16, wherein said means of photolithographic chemical etching comprises laser-supported etching.

33. A method according to claim 17, wherein said ceramic material comprises silicon.

34. A method according to claim 17, wherein said ceramic material comprises surface-oxidized silicon.

35. A method according to claim 17, wherein said ceramic material comprises silicon nitride.

36. A method according to claim 17, wherein said ceramic material comprises highly doped silicon.

37. A method according to claim 14, wherein a metallic material is used as a substrate material.

38. A method according to claim 37, wherein said metallic material comprises a thinned metal sheet.

39. A method according to claim 14, wherein said openings of said substrate are created by laser-supported micro-drilling.

40. A method according to claim 14, wherein said substrate is polished using electrochemical means at least on a side on which said incident beam impinges.

41. A method according to claim 14, wherein said substrate comprises a wafer.

42. The beam splitter of claim 1, wherein said cross-section is substantially constant through said functional element.

43. The method of claim 14, wherein said cross-section is substantially constant through said substrate.

44. The beam splitter of claim 1, wherein said thickness is less than 100 $\mu$m at said openings.

* * * * *